US 9,026,093 B2

(12) United States Patent
Niemenmaa et al.

(10) Patent No.: US 9,026,093 B2
(45) Date of Patent: *May 5, 2015

(54) PROVIDING LOCATION INFORMATION (75) Inventors: Jarko Niemenmaa, Espoo (FI); Ville Ruutu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1166 days.

This patent is subject to a terminal disclaimer.

(21) Appl. No.: 11/980,637

(22) Filed: Oct. 31, 2007

(65) Prior Publication Data

US 2008/0064380 A1 Mar. 13, 2008

Related U.S. Application Data

(63) Continuation of application No. 10/801,640, filed on Mar. 17, 2004, now Pat. No. 7,317,910.

(30) Foreign Application Priority Data

Jan. 13, 2004 (FI) ...................................... 20040037

(51) Int. Cl.
*H04M 3/42* (2006.01)
*H04L 12/28* (2006.01)

(52) U.S. Cl.
CPC .................................. *H04L 12/2854* (2013.01)

(58) Field of Classification Search
CPC .......... H04W 4/00; H04W 4/02; H04W 4/046
USPC .......... 455/404.1, 456.1–457, 414.2; 370/338
See application file for complete search history.

(56) References Cited

U.S. PATENT DOCUMENTS

| 6,225,944 | B1 | 5/2001 | Hayes |
| 6,769,000 | B1 | 7/2004 | Akhtar et al. |
| 7,308,237 | B2 | 12/2007 | Kokkonen et al. |
| 7,822,423 | B2 | 10/2010 | Maanoja et al. |
| 2002/0089949 | A1 | 7/2002 | Bjelland et al. |
| 2003/0228872 | A1 | 12/2003 | Cervera et al. |
| 2004/0242238 | A1 | 12/2004 | Wang et al. |
| 2005/0043038 | A1 | 2/2005 | Maanoja et al. |
| 2005/0153706 | A1 | 7/2005 | Niemenmaa et al. |
| 2005/0197140 | A1 | 9/2005 | Ruutu et al. |

FOREIGN PATENT DOCUMENTS

| WO | 03/045084 | 5/2003 |
| WO | 03/045084 A2 | 5/2003 |
| WO | 2004/004394 | 1/2004 |
| WO | WO 2004/004394 A1 | 1/2004 |
| WO | WO 2004/080096 A2 | 9/2004 |

*Primary Examiner* — Steven D Agosta
(74) *Attorney, Agent, or Firm* — Squire Patton Boggs (US) LLP (57) ABSTRACT

In a method in association with a communication system a request for a connection is signaled between a user equipment and another party. The requested connection is then analyzed. Subsequent to detection that location information is required in association with the requested connection, a process for determining information about the location of the user equipment is activated. First information in association with the determining process is communicated on a control plane between the user equipment and the communication system, while second information in association with the determining process is communicated on a user plane between the user equipment and the communication system. An arrangement in association with location services and a user equipment capable of providing location information is also disclosed.

12 Claims, 3 Drawing Sheets

PROVIDING LOCATION INFORMATION

CROSS-REFERENCE TO RELATED APPLICATIONS:

This is a continuation application of U.S. patent application Ser. No. 10/801,640, filed on Mar. 17, 2004. The disclosure of the prior application is hereby incorporated by reference in its entirety.

BACKGROUND OF THE INVENTION

1. Field of the Invention

The invention relates to providing information regarding location of a mobile user equipment, and in particular to communication of various information when providing location information.

2. Description of the Related Art

Various services can be provided for a user of a mobile user equipment by means of a communication system. Recent development in the field of mobile user equipment has lead to arrangements wherein information about a location of a mobile user equipment is determined and utilized when providing services for the user equipment and/or other parties. Such services may sometimes be called location sensitive services.

A mobile user equipment may comprise, for example, a mobile telephone, a laptop computer, a personal data assistant or any other user equipment enabled for wireless communication with another station. An example of a communication system providing mobility for users thereof is the public land line mobile network (PLMN) or cellular network. Another example is a mobile communication system that is based, at least partially, on use of communication satellites. Wireless communications may also be provided by means of other arrangements, such as by means of wireless local area networks (WLAN).

The skilled person is aware of the basic principles of a wireless communication system. A wireless communication system typically operates in accordance with a given standard or specification which sets out what the various elements of the system are permitted to do and how that should be achieved. For example, the standard or specification may define if the user, or more precisely, user equipment or terminal is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

A communication system needs to be able to provide various different functions in order be able to operate. These functions can be divided in different categories. A category comprises functions that relate to the actual carrying of communications such as voice or multimedia or other data content in the system. Another category can be seen as being formed by control or management functions such as the control of various services and the actual communication. Signaling associated with different functions is thus understood as being carried on different planes. For example, control messages are communicated on a control plane and the actual communication is transported on a user plane. The communication on the user plane is supported the signaling of the control messages on the control plane. The predefined rules commonly dictate the appropriate plane that shall be used for communication.

Typically the communication systems provide the different planes by means of separate channels, e.g. by means of separated signaling and communication channels. Such arrangements are employed e.g. by signaling system 7 (SS7) core networks and Q.931/GSM/WCDMA subscriber access. Therefore the term signaling channel may be used when referring to control plane communications. Similarly the term communication channel may be used when referring to user plane communications.

The various functions of communication systems may have developed quite independently from each other. Different protocols may also be used in different communication systems. The standards and protocols define e.g. which plane shall be used for a certain purpose.

The mobile network apparatus and/or user equipment can be employed for providing information regarding the geographical location of the user equipment and thus the user thereof. In addition to location in the home network of a user, it is also possible to determine information about the geographical location of a user equipment when the user equipment is located outside the home network, i.e. when the user equipment is located in a coverage area of a visited or "foreign" network. The visited network may either transmit the location of the mobile user equipment back to the home network or the information may be used locally in the visited area.

A mobile user equipment and thus the user thereof can be positioned by various different techniques. For example, substantially accurate geographical location information that associates with a user equipment can be obtained based on a satellite based positioning system, for example the GPS (Global Positioning System) or Galileo. More accurate location information can be obtained through a differential GPS or an assisted GPS (A-GPS). In an approach the cells or similar geographically limited radio access entities and associated controllers of the communication system are utilized in production of an estimate concerning the location of a mobile user equipment. To improve the accuracy of the location information the communication system may be provided with additional equipment, for example specific location measurement units (LMUs), that provide more accurate data or additional data that may be used when determining a location of a mobile user equipment.

Location information may be used for various purposes, such as for location of a mobile telephone that has made an emergency call or for other call related services, for locating given mobile subscribers for commercial purposes and so on. In general, a client (for example a user or a network entity wanting to receive location information regarding a user may) may send a request for location information to a location service entity. The location service entity may be, for example, a location service server provided in the network or the target user equipment itself. An appropriate location service entity may then process the request, obtain the required data and generate an appropriate response.

Communication associated with location services may be signaled on the control plane or the user plane. The selection of the plane depends on the application. That is, the location service associated communications to and from a user equipment may occur either on a control plane or a user plane.

Applications that use control plane for communication of information for location determination commonly employ embedded signaling protocols. However, this may cause relatively high load on the control plane. The high loading may cause problems especially on the air interface between a mobile user equipment and a radio network servicing the mobile user equipment.

Thus it has been proposed that a mobile user equipment could be located by using user plane signaling for communications of location services information. Some of user plane applications are a kind of overlay solutions wherein a data connection is established on a user plane between a relevant server and a mobile user equipment to transfer on radio interface information that is needed in location determinations. The user plane data connection may be a dedicated connection established for communication of location information. In another approach location information may be communicated on a user plane connection established for other purposes. The user plane signaling may be based on appropriate communication protocol, for example the Internet Protocol (IP) or data messages such as short message service (SMS) messages. Data may need to be transferred from a user plane enabled server to a user equipment and/or from a user plane enabled server to a user equipment. An example of the proposals presented in Open Mobile Alliance (OMA) wherein user plane is used is known by the work name 'Secure User Plane Location' (SUPL).

Communications on the user plane commonly occur transparently for the underlying access network systems. In other words, the radio access network (RAN) may not be aware of the type of the user plane communications. This may be problematic, for example if the communications relate to location services and/or calls to emergency numbers. If a location service of a communication system is based on user plane communications, triggering of locations services for a specific connection, for example for an emergency call, may not be possible. The user plane location service communications and control plane communications of the emergency cannot be associated to each other because there is no suitable interface for this purpose. Because of the lack of the interface the user plane location service entity may not be able to identify the origin of an emergency call, and thus cannot know the target of location determinations. Therefore a mechanism that enables triggering of location services for certain types of connections even if user plane communications are used for communication of information during the location determination procedure might prove to be useful.

SUMMARY OF THE INVENTION

Embodiments of the present invention aim to address one or several of the above problems.

According to one embodiment of the present invention, there is provided a method in association with a communication system for providing location information. In the method a request for a connection is signaled between a user equipment and another party. The requested connection is then analyzed. Subsequent to detection that location information is required in association with the requested connection, a process for determining information about the location of the user equipment is activated. First information in association with the determining process is communicated on a control plane between the user equipment and the communication system, while second information in association with the determining process is communicated on a user plane between the user equipment and the communication system.

According to another embodiment there is provided an arrangement for providing location information in association with a communication system configured for communication of information relating to determination of a location of a user equipment. The communication system comprises a controller configured to detect if location information is required in association with a connection and to activate a process for determining information about a location of a user equipment in response to detection that information about the location of the user equipment is required. Connection means are also provided for providing a connection between a user equipment and another party. The connection means are configured to communicate first information in association with a location determining process on a control plane and second information in association with the location determining process on a user plane.

According to yet another embodiment there is provided a user equipment. The user equipment comprises a controller configured to activate a process for determining information about the location of the user equipment in response to detection that information about the location of the user equipment is required, a location information processing entity configured to process information required by a location determining process, and a transceiver for wireless communication of information required by a location determining process. The transceiver is configured for communication of first information in association with a location determining process on a control plane and second information in association with the location determining process on a user plane.

According to yet another embodiment there is provided a node for a communication system configured for processing location information. The node comprises a controller and connection means. The controller is configured to activate determination of information associated with location of a user equipment in response to detection that information about the location of the user equipment is required. The connection means are configured to communicate first information in association with a location determining process on a control plane and second information in association with the location determining process on a user plane.

According to yet another embodiment there is provided a gateway for a communication system. The gateway comprises a controller configured to activate determination of information associated with location of a user equipment in response to detection that information about the location of the user equipment is required. Connection means are also provided, the connection means being configured to communicate at least one of first information and second information in association with a location determining process with a user equipment that is configured to communicate said first information on a control plane and said second information on a user plane.

The embodiments may enable a hybrid solution for providing location information such that a part of the communications occurs on the control plane while a part of the communications occurs on a user plane. The embodiments may use existing control-plane location procedures as much as possible for call related location.

BRIEF DESCRIPTION OF DRAWINGS

For better understanding of the present invention, reference will now be made by way of example to the accompanying drawings in which.

Figure 1:
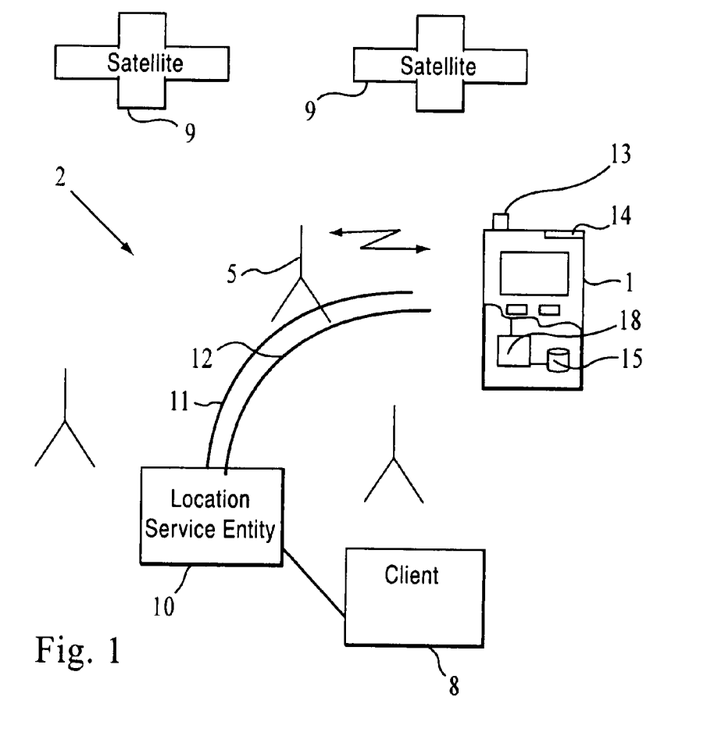
FIG. 1 shows a communication system wherein the present invention may be embodied.

DETAILED DESCRIPTION OF THE PREFERRED EMBODIMENTS:

Reference is first made to FIG. 1 which is a simplified presentation of a communication system in which the present invention can be embodied. It is noted that although this specification makes references to various elements associated with specific types of radio access networks and communication systems, these are shown and described only to facilitate the understanding of the invention. Similar functionalities may be provided by a number of alternative arrangements.

More particularly, FIG. 1 shows a cellular network 2 providing mobility for a mobile user equipment 1. The network 2 is provided with an appropriate number of radio access networks or cells. The mobile user equipment 1 may communicate on a wireless interface with a base station 5 of a serving radio access network of the communication system 2. For example, a user equipment within a radio access network may communicate with a radio network controller via radio network channels which are typically referred to as radio bearers (RB). Each user equipment may have one or more radio network channel open at any one time with the radio network controller.

Each of the base stations/access networks is commonly controlled by an appropriate controller. The access network controller may be connected to appropriate core network entities of the cellular system, such as a MSC (mobile switching centre) and/or SGSN (serving general packet radio service support node), via a suitable interface arrangement.

Any appropriate mobile user equipment adapted for the communication with the access network may be used to connect the network. For example, a user may access the cellular network by means of a user equipment such as a Personal computer (PC), Personal Data Assistant (PDA), mobile station (MS), for example a mobile phone and so on. One skilled in the art is familiar with the features and operation of a typical mobile user equipment such as a mobile station. Thus it is sufficient to note that a user may use a mobile user equipment for tasks such as for making and receiving phone calls, for receiving and sending data from and to the network and for experiencing e.g. multimedia content.

Transceiver means 13 of a mobile user equipment 1 may include appropriate antenna means for wirelessly receiving and transmitting signals from and to base stations of the mobile communication network. A mobile user equipment is typically also provided with a processor 18 and memory 15. A mobile user equipment may also be provided with a display for displaying images and other graphical information for the user of the mobile user equipment. Speaker means may also be provided. A user interface for controlling the operation of a mobile user equipment may be provided by means of an appropriate user interface such as control buttons, voice commands and so on.

It shall be appreciated that a number of user equipment may be in communication via the cellular system although only one mobile user equipment is shown in FIG. 1 for clarity.

The location of the mobile user equipment 1 may vary in time as the user equipment is free to move within the coverage area of a base station and also from a cell to another cell, and even from a network to another network. As mentioned above, the modem communication systems are capable of communicating information regarding the geographical location of a user equipment.

The geographical location may be defined, for example, on the basis of the position of the mobile user equipment relative to at least one base station and/or based on information from a satellite based system 9 or from other external location information resource. The geographical location of the user equipment may be defined, for example, in X and Y co-ordinates or in latitudes and longitudes. A possibility is to use the relation between defined radiuses and angles, e.g. based on the spherical coordinate system or alike. It is also possible to define the location of the base stations and/or mobile user equipment in vertical directions. For example, Z co-ordinate may be used when providing the location information in the vertical direction. The vertical location may be needed e.g. in mountainous environments or in cities with tall buildings.

The user equipment 1 may be adapted to perform at least a part of location measurements and/or calculations. Thus processing of the location determination may be performed at least partially by a processor provided in the user equipment 1. In order to determine its location, a user equipment may be configured to process information received from external sources. At least a part of the location information may be provided based on information provided by system that is separate from the communication system. For example, information may be provided by means of a satellite based system 9, such the Global Positioning System (GPS), differential GPS, Galileo or similar. In order to process e.g. the GPS information, the user equipment may need to be provided with a GPS receiver and means for processing GPS data. As shown in FIG. 1, a GPS receiver 14 may be an integrated part of a user equipment 1 in applications wherein the GPS is used for provision of the location information, for example in the Assisted GPS (A-GPS) methods.

FIG. 1 shows also a location service (LCS) client 8.

A location service client may request for location information from the communication system, for example from a specific location service server or directly from the target user equipment. A location service client 8 can be any entity that may make use of the location information. Thus a location service client 8 can be seen as a logical functional entity that may make a request for location information of one or more target user equipment for what ever purposes. Non-limiting examples of location service clients include service applications such as pure location information services, games wherein location information can be utilized, fleet management applications and emergency services.

A location service client typically needs to be authorized in a predefined manner to be allowed receive at least some degree of information concerning location (or location history) of a target user equipment. The location service client may be an entity that is external to the communication network. The location service client may also be an internal client (ILCS) i.e. reside in any entity or node (including a mobile user equipment) within the communication system.

In order to provide location information, the communication system may be provided with various different elements and functions for determining the geographical location of a target user equipment. The location information may be obtained by using one or a plurality of appropriate location techniques. A location service entity may include capabilities such as functions for handling Service Area Identities (SAI), Assisted GPS (A-GPS), stand-alone Assisted GPS (S/A GPS), and OTDOA.

A location service may be provided by various manners in association with a communication system. FIG. 1 shows an arrangement wherein a location service server 10 is provided in association with the network 2. However, it is understood that a location service functionality associated with a network may comprise a number a location service entities, for example a controlling location service server in addition to at least one user plane location server. A non-limiting example of such arrangements is given in 3G specifications wherein a location service (LCS) server entity referred to as a Gateway Mobile Location Center (GMLC) is specified to provide an entity managing the location services. The GMLC is for gathering and storing various data that may be used in provision of location information for the location service clients (LCS clients). However, since a distributed location service is not required in all embodiments, only one location service entity is shown in FIG. 1.

The location service entity 10 may communicate with the user equipment 1, for example to request terminal based positioning information, to request terminal measurements or to deliver location service assistance data. In the embodiments communication of information supporting the operation of a location information service may be carried on a user plane connection 12 between the user equipment 1 and the location service entity 10. For example, packet switched internet protocol (IP) user plane connection may be provided for communication of data in association with location information services. Messages that relate location information services, for example request for supporting information and responses to such request, may be delivered via a user plane connection that has been established in response to detection that location information is needed in association with a requested connection.

Figure 2:
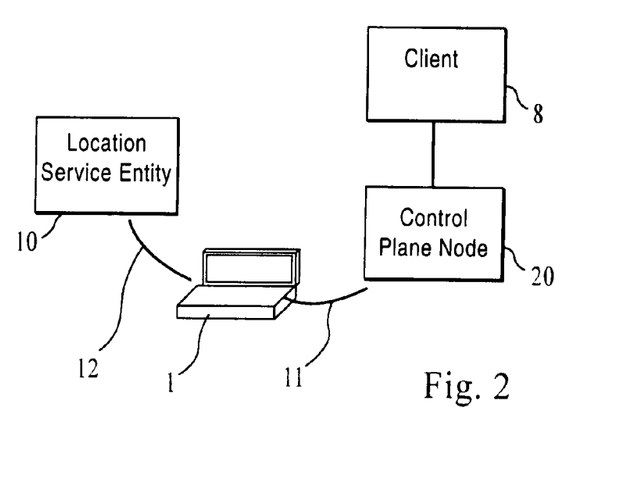
FIG. 2 shows another embodiment.

In FIG. 1 a control plane connection 11 and a user plane connection 12 are shown as being established between the user equipment 1 and the location service entity 10 of the network 2. However, it is understood that this is not the only option. For example, a control plane connection may be established between the user equipment and another server than server 10 of FIG. 1. This is illustrated in FIG. 2 wherein a control plane connection 11 is formed between a user equipment 1 and a control plane node 20 and a user plane connection 12 is formed between the user equipment 1 and a user plane location service server 10.

The control plane server may be provided, for example, by means of a GMLC. It is to be understood that the GMLC is only an example, and that the control plane node 20 may be provided any appropriate gateway element or server, for example a messing gateway, configured for use in association with location information service processes.

There are several ways how user plane communications between a location service entity and a user equipment may be arranged. According to a preferred approach communications between a location service entity and a user equipment is based on the Internet Protocol, the routing being thus based on the IP addresses thereof. Use of IP addresses allows establishment of dedicated IP sessions between a user equipment and a location services entity.

The client 8 may send the request to a specific location service server comprising components and bearers needed to serve client applications from a location service (LCS) functionality provided in association with a communication system. A location estimate may be provided in response to the request based on information from various sources connected to the communication system.

As mentioned above, location data may be processed in the user equipment that is provided with appropriate processing capacity. The user equipment may then provide a location service entity of the network or the client directly with processed data such as location co-ordinates.

In some applications assistance data is communicated from a network server to a user equipment to enhance the operation thereof. For example, sensitivity, coverage and response time may be enhanced by means of additional information assisting in the provisioning of the location data. For example, the above referred GPS assistance data may be transferred to the user equipment using a user plane IP connection. The A-GPS assistance data may be transferred over the IP connection without any proprietary connection to an assistance server. Some of the assisted GPS procedures in the user equipment may require initial rough location information estimate, for example a cell level knowledge of the position of the user equipment. This information may also be provided for the user equipment by means of the assistance data.

It shall be appreciated that supporting information such as assistance data may be provided by an entity that may also perform at least a part of the required location calculation services.

It is also possible that a GPS enabled user equipment produces GPS assistance data for use in location determination by a network based entity. The assistance data can then be reported to appropriate location service entities using a dedicated user plane session.

The following will describe in detail some exemplifying embodiments with reference to emergency calls. Emergency calls are an example of calls wherein it may be necessary to establish a location of a party making an emergency call such that the location determination procedure is initiated automatically in response to detection of the type of a call. An emergency call may be made to a commonly used emergency number, for example 911 in the US or 112 in Europe.

The herein described embodiments use a hybrid solution for emergency calls. That is, emergency call related location information service may be requested using control plane communications. Assistance data or other supporting information may then be communicated by means of user plane communications.

Figure 3:
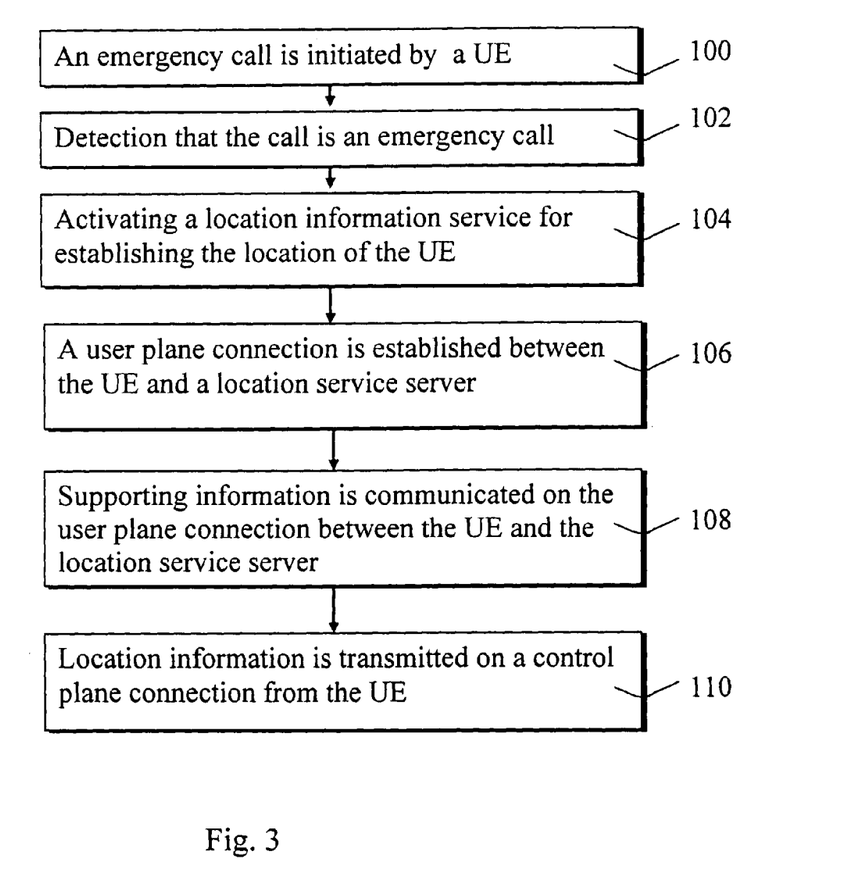
FIGS. 3 and 4 are flowcharts illustrating the operation of two specific embodiments.
Figure 4:
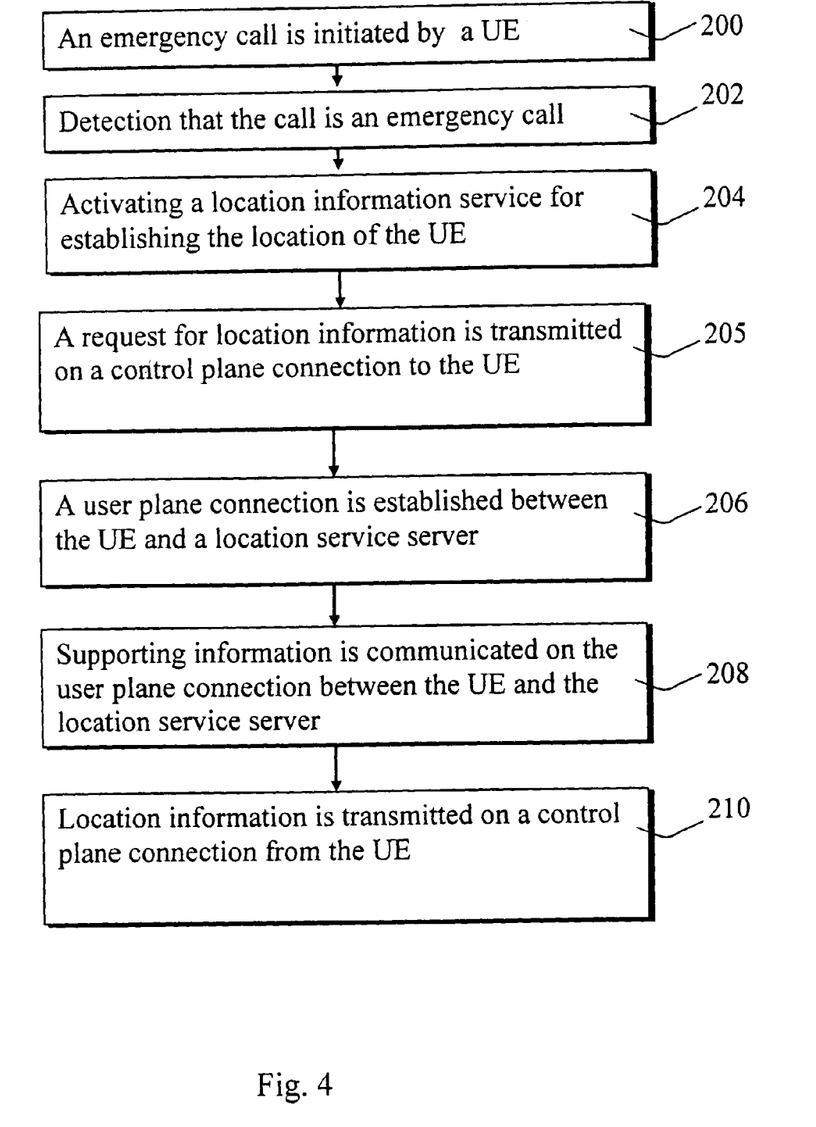

Reference is now made to the flowchart of FIG. 3 illustrating a possible flow of events in association with an emergency call. An emergency call is made at step 100 by a user equipment. The call is analyzed to determine id it satisfies a predefined condition, i.e. if the call is an emergency call. Soon after the initiation of the call set-up procedure, it is detected by means of the analysis at step 102 that the call is an emergency call.

The analysis may be performed in various manners. For example, the mobile user equipment making a call may be configured to monitor if a dialed number is an emergency call number. The detection may be based, for example, on number analysis wherein a processor of a user equipment screens the called numbers, and if it detects that the called number is for example one of '911' (in the USA), '999' (in the United Kingdom) and '112' (commonly in Europe), it concludes that the call is an emergency call.

An emergency call associated location determination may then be activated at step 104 in response to detection that the call is an emergency call.

If a mobile user equipment detects that a call is an emergency call, it may then initiate at step 106 a user-plane connection to a user plane location service server.

A user plane connection may be set-up for example since the user equipment may need supporting information such as assistance data to determine its location. In FIG. 3 assistance data is communicated to the user equipment at step 108.

The mobile user equipment may also use the user plane for communication of information about its location or measurements to a user plane server in the network. For example, such data may be communicated on the user plane in the case of so-called mobile station (MS) assisted A-GPS.

In embodiments wherein the user equipment detects the type of the call and automatically initiates a process for location determination it may not be necessary to communicate any location requests from the network to the user equipment at this stage.

Any appropriate routing information may be utilized in the set-up of the user plane connection. For example, the user equipment may be provided with an IP address of the location service server 10 which may then be used in the set-up. The user plane address of the server may be provided to the user equipment in various manners. For example, address information may be stored in a memory 15 of the user equipment 1 of FIG. 1, or the address may be delivered to the user equipment from an appropriate network entity.

At step 110 information associated with location determinations may be communicated from the user equipment to appropriate network element, for example a serving location information service server, on the control plane 11. The serving location service server may then communicate information regarding the location of the target user equipment to the client application.

In accordance with an embodiment the detection step may be performed by another entity that the user equipment. In such operation an appropriate network element rather that a user equipment first recognizes that a call is an emergency call. A possible procedure for such operation is shown in FIG. 3.

The detecting network element may be, for example, a Mobile Switching Center (MSC), a Serving General Packet Radio Service Support Node (SGSN), a Gateway General Packet Radio Service Support Node (GGSN or any other appropriate network controller. According to a possibility a Public Safety Answering Point (PSAP) provides the detecting entity.

Subsequent to detection at step 202 the detecting element may request from an appropriate source, for example from a Gateway Mobile Location Center (GMLC) or the target user equipment location information related to a mobile user equipment having requested for an emergency call connection. The location service is then activated at step 204.

At step 205 a request for location of the user equipment may be communicated on control plane to the user equipment. The request may be, for example, a request for stand-alone location determination by the user equipment.

The location procedures on various planes may be started by various entities. For example, for an emergency call a network controller such as a MSC may start a control plane location procedure. A serving location service entity such as a GMLC may then activate a user plane and/or control plane location procedure. An appropriate location service entity may send a request on control plane to the mobile user equipment 1. The user equipment may then detect from the request that location information is required, and establish a user plane connection to the location service server 10 at step 206. Location related supporting information may then be exchanged on the user plane at step 208 to obtain a location estimate for the mobile user equipment. The location estimate may then be returned to the communication system at step 110 on the control plane.

It is also possible that the request for the location determination is transmitted to the user equipment on a user plane connection at step 205. The appropriate location service server may be provided with information regarding the identity, such as a Mobile Subscriber Integrated Services Digital Number (MSISDN) or other identifier, or the user plane address of the target mobile user equipment. The user plane location service server may then use this information to establish a user plane connection to the mobile user equipment.

In accordance with a specific example an emergency call with overlay A-GPS system might follow a procedure wherein a mobile user equipment starts an emergency call for example by making a call to an emergency number. The capability information of the user equipment may be used to indicate to the network that the user equipment is 'Stand Alone GPS' capable. The user equipment may send the capability information to the network e.g. during call establishment procedures. The capability information may be indicative that it is possible to locate the user equipment by using stand alone assisted (S/A) GPS. The network may then request for S/A GPS position directly from the user equipment. The request may be made, for example in a manner similar to commonly used control plane emergency call location methods.

The user equipment may then request for assistance data from a user plane enabled location service server configured to support mobile user equipment originated assistance data delivery. The request may be transmitted either when an emergency the number is dialed or later when a S/A GPS location request is received from the network. The user equipment may then obtain assistance data from the user plane enabled location service server on user plane, and may use the assistance data when determining its location.

The user equipment then sends its location to an appropriate network element using conventional location services (LCS) control-plane signaling. The location information may be processed and utilized in appropriate manner for an emergency call, for example be forwarded to a Public Safety Answering Point (PSAP) emergency center.

The above described example may require simultaneous speech and data communications on the air interface. 3G applications already enable this. In 2G application it is possible to use for example short message service (SMS) messages for communication with the user plane enabled location service server for communication of assistance data.

The above described embodiment is an example how to provide 2G/3G emergency call location determination wherein existing control-plane emergency call location procedures may be used as much as possible. However, it shall be appreciated that the invention may also be applied to commercial applications.

It shall be appreciated that although the above describes the invention in with reference to Internet Protocol (IP) and short message service (SMS) user plane communications, the user plane communications are not limited by these examples. User plane communications may be carried, for example, on a PDP context, data call and so on.

It should be appreciated that whilst embodiments of the present invention have been described in relation to user equipment such as mobile stations, embodiments of the present invention are applicable to any other suitable type of mobile user equipment.

It is also noted herein that while the above describes exemplifying embodiments of the invention, there are several variations and modifications which may be made to the disclosed solution without departing from the scope of the present invention as defined in the appended claims.

The invention claimed is:

1. An apparatus comprising:
   a processor; and
   a memory comprising computer program code,
   the memory and the computer program code configured to, with the processor, cause the apparatus at least to,
   indicate that the apparatus is capable of using stand alone assisted global positioning system;
   receive a control plane request for location information, wherein the control plane request is based on the user equipment capability to use stand alone assisted global positioning system;
   detect whether user plane data is required to provide the requested location information;
   activate a process to determine the user plane data in response to detection that user plane data is required;

process information regarding the geographical location of the apparatus; and communicate the user plane data associated with a service request, wherein the data associates with provisioning of information regarding the geographical location of the apparatus, wherein if a user plane address is provided to the apparatus in the control plane request, the memory and the computer program code are further configured to, with the processor, cause the apparatus to communicate data associated with the requested service via a user plane connection using said user plane address, and if no user plane address is provided to the apparatus in the control plane request, the memory and the computer program code are further configured to, with the processor, cause the apparatus to communicate data associated with the requested service via a user plane connection established for providing the requested service.

2. An apparatus as claimed in claim 1, wherein said data communicated via the user plane comprises assistance data for use in location determinations by the apparatus.

3. An apparatus as claimed in claim 2, wherein said data communicated via the user plane comprises Global Positioning System (GPS) assistance data.

4. An apparatus as claimed in claim 1, wherein said data communicated via the user plane comprises at least one of a location information request and a response to a location information request.

5. An apparatus as claimed in claim 1, wherein the apparatus comprises a mobile user equipment.

6. The apparatus of claim 1, wherein the memory and the computer program code are also configured to, with the processor, cause the apparatus at least to perform activation of the process to determine the user plane data contingent on detecting that a call is an emergency call.

7. The apparatus of claim 1, wherein the request for location information comprises a request for stand-alone location determination by the user equipment.

8. An apparatus comprising:
a processor; and
a memory comprising computer program code,
the memory and the computer program code configured to, with the processor, cause the apparatus at least to,
indicate that the apparatus is capable of using stand alone assisted global positioning system;
receive a control plane request for location information, wherein the control plane request is based on the user equipment capability to use stand alone assisted global positioning system;
detect whether user plane data is required to provide the requested location information;
activate a process to determine the user plane data in response to detection that user plane data is required; and
communicate the user plane data associated with a service request, wherein
if a user plane address is provided to the apparatus in the control plane request, the memory and the computer program code are further configured to, with the processor, cause the apparatus to communicate data associated with the requested service via a user plane connection using said user plane address, and
if no user plane address is provided to the apparatus in the control plane request, the memory and the computer program code are further configured to, with the processor, cause the apparatus to communicate data associated with the requested service via a user plane connection established for providing the requested service,
wherein the memory and the computer program code are further configured to, with the processor, cause the apparatus to provide user plane communications by an Internet Protocol session, wherein the user plane address comprises an Internet Protocol address for the apparatus.

9. A method comprising:
indicating that the apparatus is capable of using stand alone assisted global positioning system;
receiving a control plane request for location information, wherein the control plane request is based on the user equipment capability to use stand alone assisted global positioning system;
detecting whether user plane data is required to provide the requested location information;
activating a process for determining the user plane data in response to detection that user plane data is required;
processing information regarding the geographical location of the apparatus;
communicating the user plane data associated with a service request, wherein the data associates with provisioning of information regarding the geographical location of the apparatus; and
if a user plane address is provided to an apparatus in the control plane request, communicating by the apparatus data associated with the requested service via a user plane connection using said user plane address, and
if no user plane address is provided to the apparatus in the control plane request, establishing a user plane connection for providing the requested service and communicating by the apparatus data associated with the requested service via the established user plane connection.

10. A method as claimed in claim 9, wherein said data communicated via the user plane comprises at least one of a location information request, a response to a location information request and assistance data for use in location determinations by the apparatus.

11. A method as claimed in claim 9, wherein the apparatus comprises a mobile user equipment.

12. An apparatus comprising:
means for indicating that the apparatus is capable of using stand alone assisted global positioning system;
receiver means for receiving a control plane request for location information, wherein the control plane request is based on the user equipment capability to use stand alone assisted global positioning system;
controller means for detecting whether user plane data is required to provide the requested location information and for activating a process for determining the user plane data in response to detection that user plane data is required;
means for processing information regarding the geographical location of the apparatus; and
communication means for communicating user plane data associated with a service request, wherein the data associates with provisioning of information regarding the geographical location of the apparatus, wherein
if a user plane address is provided to the apparatus in the control plane request, the apparatus is configured to communicate data associated with the requested service via a user plane connection using said user plane address, and
if no user plane address is provided to the apparatus in the control plane request, the apparatus is configured to communicate data associated with the requested service via a user plane connection established for providing the requested service.

\* \* \* \* \*